UNITED STATES PATENT OFFICE.

JOSEPH FIRMENICH, OF BUFFALO, NEW YORK.

IMPROVEMENT IN COMPOSITIONS FOR CATTLE-FOOD.

Specification forming part of Letters Patent No. 220,068, dated September 30, 1879; application filed June 2, 1879.

*To all whom it may concern:*

Be it known that I, JOSEPH FIRMENICH, of Buffalo, in the county of Erie and State of New York, have invented certain new and useful Improvements on a Method of Utilizing the Refuse from Starch-Tables; and I do hereby declare that the following description of my said invention forms a full, clear, and exact specification, which will enable others skilled in the art to which it appertains to use the same.

This invention refers to a new method of utilizing the refuse from the starch-tables of starch, grape-sugar, corn-sugar, sirup, &c., manufactories; and it consists in the new article for cattle-food obtained from the residue or waste of starch-tables, with the addition of palatable nutritious matter, as hereinafter set forth.

In the manufacture of starch from corn there is considerable waste of nutritious matter from the starch-tables or gutters, which matter is in so finely divided a state as to be suspended in the water and very difficult of recovering.

For this reason no attempts have heretofore been made to utilize this nutritious matter, which is allowed to run to waste with the water, and thereby forms a considerable item of expense in the manufacture of starch, sugar, &c., from corn.

To make this refuse matter available, and thereby turn the same to useful account, which is the object of my present invention, I have experimented considerably, with a view of recovering this refuse, and have finally discovered that, if said refuse is gathered in tanks, &c., allowed to settle for some sufficient time, washed, then freed from surplus water, and finally mixed with more substantial food, it forms an excellent food for animals.

This refuse from the starch-tables, being in so finely divided a state, is unfit for use as feed of itself, unless mixed with some other more substantial nutritious matter; and I have further discovered during my experiments that when mixed with corn-meal, starch-feed, hay, bran, &c., it is greatly relished by the animals fed with the compound, and, it containing a large percentage of nutritious matter, is an excellent food for fattening cattle, &c. I therefore propose to gather this matter or refuse, and running it in tanks, allow the floating particles to settle; after which I draw the supernatant liquid off and mix the residue, consisting largely of nutritious matter in a moist state, with other more substantial food, such as hereinbefore described.

In using this compound food I sometimes boil the mixture; but, since it is readily taken and digested by the animals, such a step in the utilization of the waste product from the starch-gutters is not an absolute necessity, and may be dispensed with if desired.

Where the liquid contains a large proportion of alkali, which is injurious to the animals, I remove the surplus by washing the sediment in the settling-tanks by alternately drawing off the liquid after settling, and adding fresh water and allow settling again, until said surplus alkali is removed and the sediment fit for food.

I find that if the refuse from the starch-tables is mixed with an equal or about an equal portion of other substantial food, such food will be in about the proper consistency for feeding.

The proportions may, however, be varied as experience with different animals may dictate.

Having thus fully described my invention, I claim as new and desire to secure to me by Letters Patent—

The food for cattle obtained from the collected residuum or waste of starch-tables, combined in about equal proportions with corn-meal or its specified equivalents.

In testimony that I claim the foregoing as my invention I have hereto set my hand and affixed my seal in the presence of two subscribing witnesses.

J. FIRMENICH. [L. S.]

Witnesses:
MICHAEL J. STARK,
JNO. STARK.